Dec. 27, 1938.　　　J. A. TENNANT　　　2,141,847

RELIEF VALVE

Original Filed July 8, 1933

Inventor
Joseph A. Tennant

By Jesse R. Stone
Lester B. Clark

Attorneys.

Patented Dec. 27, 1938

2,141,847

UNITED STATES PATENT OFFICE 2,141,847

RELIEF VALVE

Joseph A. Tennant, Houston, Tex., assignor to Abercrombie Pump Company, Houston, Tex., a corporation of Texas Original application July 8, 1933, Serial No. 679,468, now Patent No. 2,092,818, dated September 14, 1937. Divided and this application March 22, 1937, Serial No. 132,332

2 Claims. (Cl. 137—53)

The invention relates to an improvement in shear relief valves which are adapted for connection to fluid pressure lines or pumps wherein it is desired that the pressure will be released when the pressure exceeds a predetermined amount.

Still another object of the invention is to provide a plurality of shearing discs as a means of adjusting the relief pressure at which the valve will release.

Other and further objects of the invention will be readily apparent when the following description is considered in connection with the accompanying drawing wherein.

Figure 1:
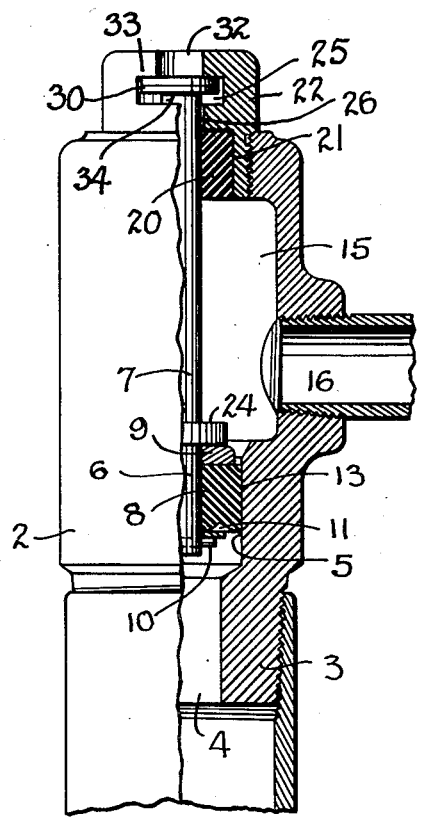
Fig. 1 shows a side view of the valve partly in section wherein shear discs are provided as a means of maintaining the valve in closed position.

The present application is a division of prior copending application Serial No. 679,468, filed July 8, 1933, for a Relief valve.

The valve housing is indicated generally at 2 and is provided with a shank or flange 3 which is to be inserted in the fluid pressure line or connection. It is to be understood that the valve may be positioned in any suitable location where it is contemplated that pressure exceeding a predetermined value will be encountered and wherein it is desired to release the pressure when it exceeds this predetermined amount. With this in mind the valve will be attached so that the pressure in the line will be available in the entrance passage 4 and will be exerted against the exposed face 5 of the valve member 6. The valve member is made up of the stem 7 and the packing or sealing element 8. The element 8 is held in position on the stem 7 by means of the washer 9 and the retaining pin 10.

It will be observed that the packing 8 is of the lip type, having the groove 11 therein so that the pressure applied to the face will tend to expand the packing and form a seal with the sealing face 13. The packing 8 is of the type described in the prior patent of Herbert Allen, No. 2,071,375, granted February 23, 1937, and permits limited movement of the stem 7 to cause shearing of the means 30 before the seal is broken with the sealing face 13. This is of advantage because if the packing adheres to the housing or is corroded in position, the valve will open at the proper pressure, because the stem 7 can move relative to the housing because of the resilience of the packing.

The entrance passage 4 leads to the relief chamber 15 and the discharge passage 16. The passage 16 may lead to the atmosphere or it may be a continuation of the connection in which the valve has been inserted.

The present type of valve is particularly adapted for high pressure lines and with this in mind a cushion 20 has been provided in the end of the housing 2 within a recess 21 in the cap 22. This cushion 20 is in the form of a resilient member against which the enlarged ring 24 on the stem 7 is arranged to abut when the stem and the valve member move to releasing position. The chamber 15 is of a size to permit the movement of the entire valve member therethrough so that it abuts the cushion 20.

Figure 2:
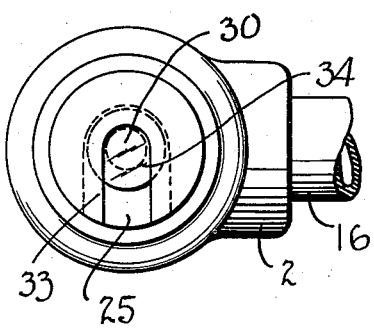
Fig. 2 shows an end view of the valve of Fig. 1.

The cap 22 is of peculiar construction in that it has a lateral slot or recess 25 therein which is wider than the opening 26 which joins the recess 21 with the recess 25. The stem 7 fits rather closely in the passage 26 so as to prevent undue distortion of the packing 20. The end of the stem 7 abuts against a shear plate or disc 30 which is disposed in the recess 25. This disc may be made of any desired material which will shear when a predetermined pressure is applied to the valve member 6 in the passage 4. As seen in Fig. 1, there are two of these discs 30 which can be provided, it being intended that any desired member of discs may be inserted in the recess in order to obtain the desired resistance to shearing, or one disc of any desired thickness may be inserted in lieu of a plurality of discs. It will be noted that the stem 7 can shear through the discs and move outwardly beyond the housing because of the end passage 32. The discs can be held in position by the overhanging lip 33 which defines the recess 25, and as seen in Fig. 2, this recess extends laterally from the periphery of the cap 22 so that the discs may be inserted from the side to overlie the end 34 of the valve stem 7.

As described in the present patent referred to and the parent application of which this is a division, it seems clear that there may be movement of the stem 7 prior to the removal of the packing member 8 from the cylinder 13 in which it is positioned. In other words, the excessive pressure will cause movement of the valve member to effect the shearing before the pressure is released.

What is claimed is:

1. A relief valve comprising a housing, a cylinder therein, a sealing member in said cylinder, a stem on said member, a cap on said housing, an opening through said cap through which said stem is slidable, and a disc across said opening and overlying the end of said stem, said stem acting to punch through said disc at a predetermined pressure to release said sealing member, said cap including a side entry slot having overhanging lips to retain said disc, said sealing member being resilient to allow shearing movement before release of the sealing member from said cylinder.

2. A shear relief valve including a housing, a valve member therein, a stem on said member, a cap on said housing having a passage therethrough for said stem, a transverse slot extending laterally into said cap and across said passage, said slot being wider than said passage so as to provide a groove around said passage, and a shear disc slipped laterally into said slot to seat in said groove and receive the end of said stem to resist movement of said valve stem.

JOSEPH A. TENNANT.